US012707033B2

(12) United States Patent
Nagasaki et al.

(10) Patent No.: US 12,707,033 B2
(45) Date of Patent: Aug. 11, 2026

(54) EXTERNAL ENVIRONMENT RECOGNITION DEVICE AND EXTERNAL ENVIRONMENT RECOGNITION METHOD

(71) Applicant: Hitachi Astemo, Ltd., Hitachinaka (JP)

(72) Inventors: Takeshi Nagasaki, Hitachinaka (JP); Haruki Matono, Tokyo (JP); Takuma Osato, Tokyo (JP); Hiroki Moizumi, Hitachinaka (JP); Keisuke Iwasaki, Hitachinaka (JP); Masayuki Kobayashi, Tokyo (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 0 days.

(21) Appl. No.: 18/836,304

(22) PCT Filed: Mar. 15, 2022

(86) PCT No.: PCT/JP2022/011524
§ 371 (c)(1),
(2) Date: Aug. 6, 2024

(87) PCT Pub. No.: WO2023/175708
PCT Pub. Date: Sep. 21, 2023

(65) Prior Publication Data

US 2025/0159122 A1 May 15, 2025

(51) Int. Cl.
*H04N 13/122* (2018.01)
*G06V 10/60* (2022.01)
*H04N 13/204* (2018.01)

(52) U.S. Cl.
CPC ........... *H04N 13/122* (2018.05); *G06V 10/60* (2022.01); *H04N 13/204* (2018.05)

(58) Field of Classification Search
CPC ........ G01B 11/24; G01B 21/045; G01C 3/06; G06V 10/60; H04N 13/122; H04N 13/204
See application file for complete search history.

(56) References Cited

U.S. PATENT DOCUMENTS

2009/0009604 A1* 1/2009 Kanaoka .............. H04N 23/698 348/148
2009/0122136 A1 5/2009 Shiraishi et al.
(Continued)

FOREIGN PATENT DOCUMENTS

JP 2007-024590 A 2/2007
JP 2007-081806 A 3/2007
(Continued)

OTHER PUBLICATIONS

"Accurate Range Image Generation Using Sensor Fusion of TOF and Stereo-based Measurement"—Fukuda et al., 978-1-5386-2982-6/18/$31.00 © 2018 IEEE. (Year: 2018).*
(Continued)

*Primary Examiner* — Mainul Hasan
(74) *Attorney, Agent, or Firm* — Foley & Lardner LLP

(57) ABSTRACT

An EXTERNAL ENVIRONMENT RECOGNITION DEVICE that reduces an influence on a ranging error caused by a temporal change of an optical system/imaging system is provided by focusing on characteristics (individual difference) of the optical system/imaging system of an in-vehicle stereo camera device. Thus, the EXTERNAL ENVIRONMENT RECOGNITION DEVICE includes a parallax calculation unit that calculates parallax by images captured by an in-vehicle camera device including a plurality of cameras, a ranging unit that obtains a distance to an object outside a vehicle by the parallax, a storage unit in which response characteristics and luminance characteristics of each lens of the plurality of cameras are recorded, a ranging correction necessity determination unit that determines whether the distance to the object is necessary to be corrected using the response characteristics and the luminance characteristics of the lens; and a ranging correction unit that corrects the distance to the object based on the response
(Continued)

characteristics and the luminance characteristics of the lens when it is determined that the correction is necessary.

5 Claims, 7 Drawing Sheets

(56) References Cited

U.S. PATENT DOCUMENTS

| | | | | |
|---|---|---|---|---|
| 2009/0153664 | A1* | 6/2009 | Higuchi | G06V 20/58 348/148 |
| 2011/0157320 | A1 | 6/2011 | Oyama | |
| 2013/0250109 | A1* | 9/2013 | Yokota | H04N 23/45 348/148 |
| 2017/0070725 | A1 | 3/2017 | Kishiwada et al. | |
| 2021/0272304 | A1* | 9/2021 | Yang | G06V 10/454 |
| 2022/0309694 | A1* | 9/2022 | Nobayashi | G01C 3/14 |

FOREIGN PATENT DOCUMENTS

| | | | | |
|---|---|---|---|---|
| JP | 2008-241491 | A | | 10/2008 |
| JP | 2015148887 | A | * | 8/2015 |
| JP | 2015-169583 | A | | 9/2015 |
| JP | 2021072601 | A | * | 5/2021 |
| WO | WO-2011/010438 | A1 | | 1/2011 |

OTHER PUBLICATIONS

"Measurement of Safe Driving Distance Based on Stereo Vision"—A-Lin et al., 2011 Sixth International Conference on Image and Graphics; 978-0-7695-4541-7/11 $26.00 © 2011 IEEE. (Year: 2011).*

International Search Report Issued in PCT Application No. PCT/JP2022/011524 dated May 31, 2022, with English Translation.

Japanese Office Action issued in corresponding JP Patent Application No. 2024-507242, dated May 27, 2025 with Machine translation (9 pages).

* cited by examiner

*FIG. 5*
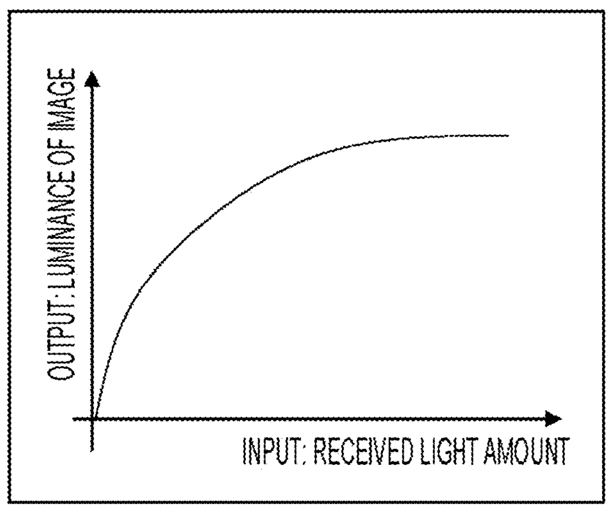

EXTERNAL ENVIRONMENT RECOGNITION DEVICE AND EXTERNAL ENVIRONMENT RECOGNITION METHOD

TECHNICAL FIELD

The present invention relates to an EXTERNAL ENVIRONMENT RECOGNITION DEVICE and an EXTERNAL ENVIRONMENT RECOGNITION METHOD for improving ranging accuracy of a stereo camera.

BACKGROUND ART

Recently, with the spread of safe driving systems, an increase in detection angle of view and an improvement in the accuracy of ranging performance have been increasingly required for in-vehicle camera devices. An in-vehicle stereo camera device, which is a type of the in-vehicle camera device, is a device that can measure visual information by an image and distance information to an object at the same timing, and thus can grasp various objects (a person, a car, a three-dimensional object, a white line, a road surface, a sign, and the like) around an automobile in detail, and contributes to improvement of performance of the safe driving. Here, examples of characteristics of the stereo camera include high spatial resolution and high accuracy in ranging of the object. This is because a distance to any object can be measured based on triangulation.

On the other hand, the stereo camera performs ranging with sub-pixel level resolution by triangulation, and thus the stereo camera has a problem that ranging performance depends on characteristics of an optical system/imaging system (a lens, an imaging element, and image processing).

In order to improve this problem, various techniques and devices for correcting (generally referred to as "aiming") a ranging error of the stereo camera have been proposed, and PTL 1 is an example thereof.

The abstract of PTL 1 discloses that "A calibration method for calibrating an absolute positional deviation on image data due to an influence of a transparent body with high accuracy is provided." as a problem, and discloses that "A method for calibrating a photographing device that photographs a subject via a transparent body, the method comprising: step S1 of photographing the subject without the transparent body to obtain a first photographed image; step S5 of photographing the subject via the transparent body to obtain a second photographed image; step S8 of calculating an absolute positional deviation indicating a deviation of coordinates of the image of the subject caused by the transparent body based on coordinates of the image of the subject in the first photographed image and coordinates of the image of the subject in the second photographed image; step S9 of calculating a correction parameter for calibrating the absolute positional deviation; and step S10 of storing the correction parameter in the photographing device." as a solution.

As described above, the problem of PTL 1 is to reduce the influence of the transparent body (specifically, a windshield) on a parallax calculation, which is one of the characteristics of the optical system. Thus, this PTL describes a method of obtaining a calibration parameter by capturing images twice in states where there is no glass and there is glass, and performing aiming processing.

The abstract of PTL 2 discloses that "An object is to provide a parallax detection device (3) and the like capable of suppressing a parallax detection error even when a camera having a lens resolution lower than a pixel pitch of an imaging element is used. The parallax detection device (3) that calculates parallax generated between a plurality of optical systems, the device comprising: a PSF identification unit (5) that corrects at least one of a plurality of images obtained from each of the plurality of optical systems such that a point image distribution of the plurality of optical systems is identical to a point image distribution of a predetermined optical system; and a parallax calculation unit (9) that calculates parallax generated between the plurality of optical systems by using the image corrected by the PSF identification unit (5)."

As described above, PTL 2 describes a parallax calculation method for reducing an influence of lens performance, in which, in a case where resolution of the lens is lower than that of the imaging system, in order to improve uniformity of images captured by left and right imaging systems, image processing is performed on left and right images so that the influence of lenses becomes uniform based on the light point spread function (PSF) which is response characteristics of the left and right lenses, and then parallax calculation is performed.

CITATION LIST

Patent Literature

PTL 1: JP 2015-169583 A
PTL 2: WO 11/010438 A

SUMMARY OF INVENTION

Technical Problem

The techniques of PTLs 1 and 2 are uniformly applied to all captured images, and uniformly improve the parallax calculation to uniformly reduce the ranging errors.

However, as actual vehicle experiments are repeated, it has been found that there is a problem of the ranging error due to an individual difference of an optical system/imaging system and a change in an imaging environment, which are not solved by the techniques of PTL 1 and PTL 2. For example, in a case of ranging of a distance to a preceding vehicle, a ranging result differs for each individual of the stereo cameras due to luminance of the object (a tail lamp or a brake lamp) and an influence of an exposure environment (whether t it is nighttime, whether it is inside a tunnel, and the like) and a temperature environment at the time of imaging, and thus, it has been found that correction processing different from the conventional technology is necessary to correct the ranging error caused by the individual difference.

Thus, the present invention provides an EXTERNAL ENVIRONMENT RECOGNITION DEVICE and an EXTERNAL ENVIRONMENT RECOGNITION METHOD that reduce the influence on the ranging error caused by a temporal change of the optical system/imaging system by focusing on the characteristics (individual difference) of the optical system/imaging system of the in-vehicle stereo camera device.

Solution to Problem

An EXTERNAL ENVIRONMENT RECOGNITION DEVICE includes a parallax calculation unit that calculates parallax from images captured by an in-vehicle camera device including a plurality of cameras, a ranging unit that obtains from the parallax a distance to an object outside a vehicle, a storage unit in which response characteristics and luminance characteristics of each lens of the plurality of cameras are recorded, a ranging correction necessity determination unit that determines whether the distance to the object is necessary to be corrected based on the response characteristics and the luminance characteristics of the lens; and a ranging correction unit that corrects the distance to the object based on the response characteristics and the luminance characteristics of the lens when it is determined that the correction is necessary.

Advantageous Effects of Invention

According to an EXTERNAL ENVIRONMENT RECOGNITION DEVICE and an EXTERNAL ENVIRONMENT RECOGNITION METHOD of the present invention, an influence on a ranging error caused by a temporal change of an optical system/imaging system can be reduced by focusing on characteristics (individual difference) of the optical system/imaging system of an in-vehicle stereo camera device. Note that problems, configurations, and effects other than those described above will be clarified by the following description of embodiments.

BRIEF DESCRIPTION OF DRAWINGS

FIG. 5 is an example of luminance characteristics.

DESCRIPTION OF EMBODIMENTS

Hereinafter, an in-vehicle stereo camera device 10 which is an embodiment of an EXTERNAL ENVIRONMENT RECOGNITION DEVICE of the present invention will be described with reference to the drawings.

<Hardware Configuration Diagram of In-Vehicle Stereo Camera Device 10>

Figure 1:
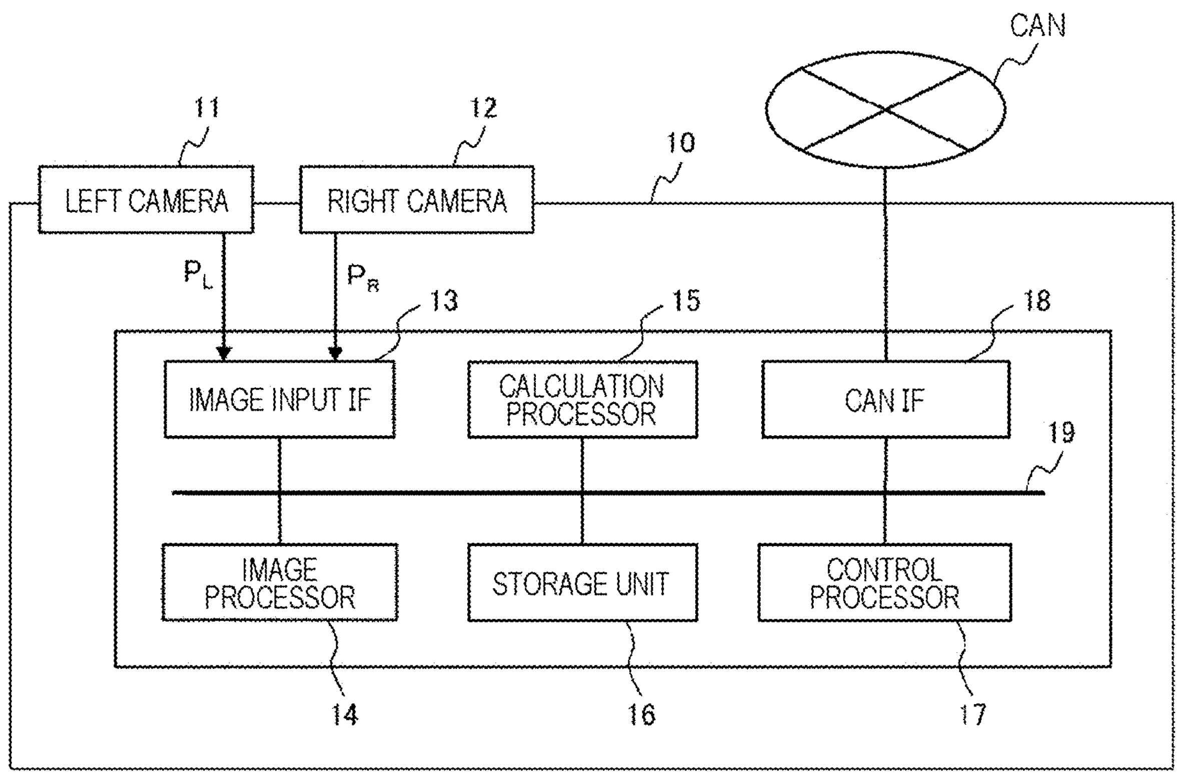
FIG. 1 is a schematic configuration diagram of an in-vehicle stereo camera device according to an embodiment.

FIG. 1 is a block diagram illustrating a schematic hardware configuration of an in-vehicle stereo camera device 10 according to the present embodiment. The in-vehicle stereo camera device 10 is a device mounted on a vehicle as part of an in-vehicle system, and is a device that recognizes a vehicle exterior environment based on image information of an imaging target region in front of the own vehicle. The vehicle exterior environment recognized by this device is, for example, a white line of a road, a pedestrian, a vehicle, other three-dimensional objects, a signal, a sign, a lighting lamp, distances to them, and the like, and the in-vehicle system controls a drive system, a braking system, a steering system, and the like of the own vehicle according to the vehicle exterior environment recognized by the in-vehicle stereo camera device 10, and achieves desired automatic driving control, driving support control, and the like.

As illustrated in FIG. 1, the in-vehicle stereo camera device 10 includes a left camera 11, a right camera 12, an image input interface 13, an image processor 14, a calculation processor 15, a storage unit 16, a control processor 17, a CAN interface 18, and an internal bus 19. Note that part of the in-vehicle stereo camera device 10 other than the left camera 11 and the right camera 12 is specifically a computer including a calculation device such as a CPU, a storage device such as a semiconductor memory, and a hardware such as a communication device. Then, the calculation device executes a predetermined program to implement each function of the image processor 14, the calculation processor 15, and the control processor 17. Hereinafter, details of each unit will be described while appropriately omitting such a known technique.

The left camera 11 and the right camera 12 are a pair of left and right cameras installed on an upper portion of an inner surface of a windshield of the own vehicle or the like so as to be able to capture a pair of left and right images P (Left image $P_L$ and right image $P_R$) in front of the own vehicle.

The image input interface 13 is an interface that controls imaging of both cameras and captures the captured images P. The images P captured through the image input interface 13 is transmitted to the image processor 14 and the calculation processor 15 via the internal bus 19.

The image processor 14 compares the left image $P_L$ from the left camera 11 with the right image $P_R$ from the right camera 12, corrects a device-specific deviation caused by an imaging element or performs image correction such as noise interpolation on each image, and then stores the corrected left image $P_L$ and right image $P_R$ in the storage unit 16. In addition, the image processor 14 specifies mutually corresponding portions between the corrected left and right images, calculates parallax information, and stores the parallax information obtained by the calculation in the storage unit 16.

The calculation processor 15 recognizes various objects necessary for perceiving the environment around the vehicle by using the corrected images P and parallax information (distance information for each point on the image) stored in the storage unit 16, and stores the recognized objects in the storage unit 16. Note that the various objects recognized by the calculation processor 15 are a person, a car, other obstacles, a traffic light, a sign, a car tail lamp, a headlight, and the like.

The control processor 17 calculates a control policy of the vehicle necessary for achieving desired automatic driving control, driving support control, and the like by using information of various objects recognized by the calculation processor 15. In addition, the control processor 17 monitors whether each processor has caused an abnormal operation, whether an error has occurred at the time of data transfer, and the like, thereby configuring a mechanism for preventing an abnormal operation.

The CAN interface 18 is an interface that transmits a control policy of the vehicle obtained as a calculation result by the control processor 17 and some of object recognition results by the calculation processor 15 to the in-vehicle network CAN.

The internal bus 19 is a bus that connects the image input interface 13, the image processor 14, the calculation processor 15, the storage unit 16, the control processor 17, and the CAN interface 18 described above to each other.

<Functional Block Diagram of in-Vehicle Stereo Camera Device 10>

Figure 2:
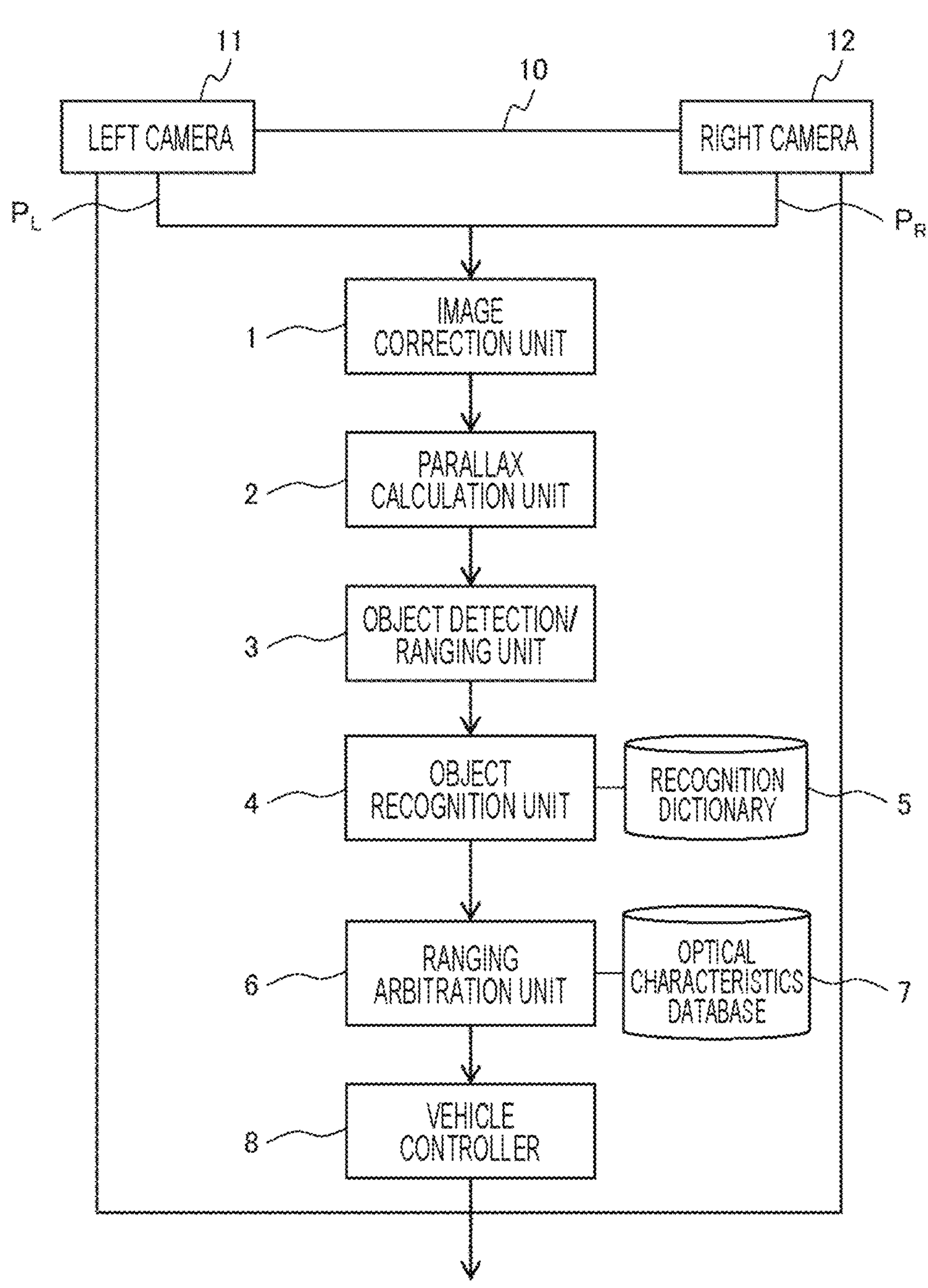
FIG. 2 is a functional block diagram of an in-vehicle stereo camera system according to an embodiment.

FIG. 2 is a diagram illustrating the in-vehicle stereo camera device 10 in FIG. 1 as a functional block. When expressed as the functional block, the in-vehicle stereo camera device 10 includes the left camera 11, the right camera 12, an image correction unit 1, a parallax calculation unit 2, an object detection/ranging unit 3, an object recognition unit 4, a recognition dictionary 5, a ranging arbitration unit 6, an optical characteristics database 7, and a vehicle controller 8.

An example of the relationship between FIGS. 1 and 2 will be briefly described. The image correction unit 1 and the parallax calculation unit 2 in FIG. 2 are functional units achieved by the image processor 14 in FIG. 1. The object detection/ranging unit 3, the object recognition unit 4, and the ranging arbitration unit 6 in FIG. 2 are functional units achieved by the calculation processor 15 in FIG. 1. The vehicle controller 8 in FIG. 2 is a functional unit achieved by the control processor 17 in FIG. 1. The recognition dictionary 5 and the optical characteristics database 7 in FIG. 2 are data stored in advance in the storage unit 16 in FIG. 1.

First, the image correction unit 1 generally performs image correction such as non-linear image position mapping and luminance correction for the left image $P_L$ captured by the left camera 11 and the right image $P_R$ captured by the right camera 12 in order to correct a peculiarity of the imaging element and lens of each camera.

Next, the parallax calculation unit 2 performs stereo vision processing on the left image $P_L$ and the right image $P_R$ corrected by the image correction unit 1, that is, parallax calculation processing on each pixel or each local region on the image. As a result, the parallax calculation unit 2 generates a stereo image. Details of the parallax calculation processing will be described later.

The object detection/ranging unit 3 cuts out a predetermined portion of the stereo image generated by the parallax calculation unit 2, extracts a cluster considered to be a cluster of objects at the same position from a distribution of parallax values, and performs ranging on the cluster considered to be the object.

In addition to a result of the object detection and the ranging, the object recognition unit 4 performs object recognition such as whether the object is a pedestrian, a bicycle, a motorcycle, or a vehicle, or a light point (for example, a tail lamp or a brake lamp of a preceding vehicle) at night by image recognition. In the object recognition by the object recognition unit 4, known pattern matching determination is performed using the recognition dictionary 5 recorded in advance.

The ranging arbitration unit 6 executes ranging arbitration processing according to the object. Note that the ranging arbitration is performed with reference to the optical characteristics database 7 indicating individual characteristics of the left camera 11 and the right camera 12 incorporated in the in-vehicle stereo camera device. Details of the ranging arbitration processing will be described later.

Finally, the vehicle controller 8 determines control contents of the vehicle equipped with the in-vehicle stereo camera device 10. For example, warning issuance to passengers, and vehicle braking such as acceleration/deceleration and steering of the own vehicle are determined.

<Details of Parallax Calculation Processing by Parallax Calculation Unit 2>

Figure 3:
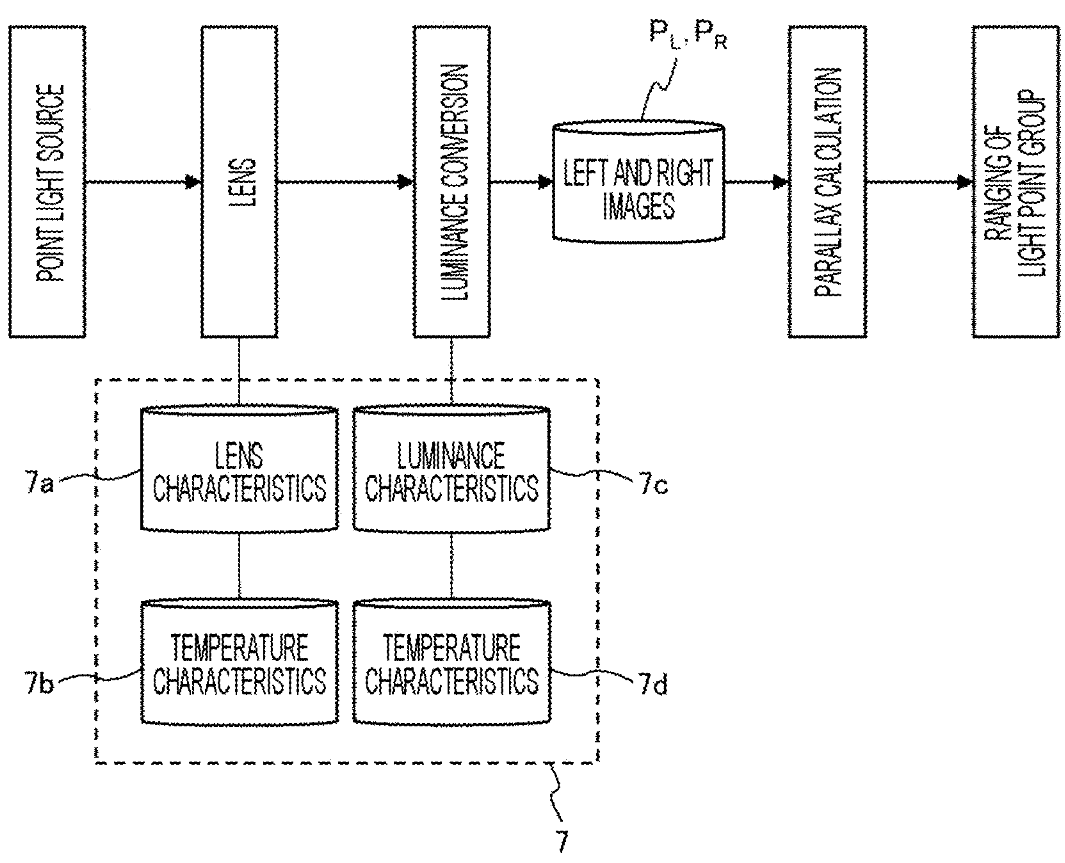
FIG. 3 is an example of a physical model used when optical characteristics are obtained.

FIG. 3 is a physical model that simplifies a process of the parallax calculation in the in-vehicle stereo camera device 10, and illustrates a mechanism of the present invention. Considering an impulse response process using a point light source, an external object can be regarded as being constituted by a point light source group, and in a case where the point light source group is imaged on the imaging element, roughly, two processing processes are performed.

Figure 4:
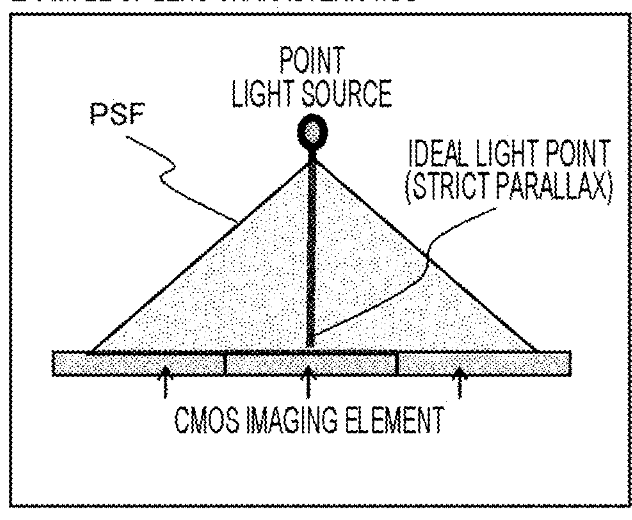
FIG. 4 is an example of lens characteristics.

A first processing process is a processing process in the lens. The characteristics of the lens include response characteristics such as a light point spread function PSF. As illustrated in FIG. 4, the light point spread function PSF is a response characteristics that can define how the point light source spreads on an imaging element surface (CMOS surface), and a projection light amount of the point light source on the imaging element surface is determined by a shape defined by the light point spread function PSF.

A second processing process is a processing process in the imaging element. The light projected on the imaging element surface is first converted into an electronic intensity according to an intensity the light (number of photons). Next, as illustrated in FIG. 5, in information of a received light amount electronically stored in each imaging element, a signal intensity is converted in analog/digital manner on an electric signal, and finally becomes the captured images of the left and right cameras, that is, a collection of two-dimensional luminance values.

The processing process in the imaging element is a process in which intensity information of light discretized in a lattice shape is converted into the luminance value on the image by focusing on a certain dynamic range, and for indicating characteristics of the process, a luminance conversion table (obtained by converting FIG. 5 into tabular data) defining a relationship between the received light amount and image luminance plays an important role.

The parallax calculation by the parallax calculation unit 2 is performed on the left image $P_L$ and the right image $P_R$ obtained through these two processing processes. However, lens characteristics affecting the first processing process and luminance conversion characteristics affecting the second processing process change under the influence of a lapse of time, an environmental temperature, and external factors, and are not always constant. Thus, there is a possibility that an error occurs in the parallax calculation by the parallax calculation unit 2 due to the change in the lens characteristics and the luminance conversion characteristics.

Even in a conventional stereo camera, a technique such as automatic adjustment has been applied in order to cope with a change occurring in a traveling environment. This is based on the assumption that the error occurs due to deformation of a housing of the stereo camera, an optical axis deviation between the lens and the imaging surface, or the like. In such a case, there is a case where modeling is applied in which a certain amount of bias is applied as the parallax error, and thus, the problem of the automatic adjustment can be solved by introducing processing of finding a bias that should be uniformly applied to the parallax and uniformly eliminating the bias.

On the other hand, in a case where a shape of the response characteristics (light point spread function PSF) of the lens changes due to the lapse of time or a temperature change, or in a case where the change in the response characteristics is related to the luminance conversion characteristic, not only the uniform bias but also a unique error may be applied according to the luminance of the object or an external situation. This problem cannot be solved only by uniform bias correction as in the conventional automatic adjustment, and another countermeasure is necessary. Another countermeasure is "ranging arbitration" performed by the ranging arbitration unit 6 in FIG. 2.

<Details of Ranging Arbitration Processing by Ranging Arbitration Unit 6>

The ranging arbitration by the ranging arbitration unit 6 is different from the automatic adjustment and the aiming of the conventional technology in that the ranging arbitration is not uniformly applied to all captured images but is locally (a specific object, specific imaging environment, and a specific traveling scene) applied. For example, even in the in-vehicle stereo camera device 10 having the same specification, there are rare individuals in which the ranging in the daytime traveling scene is good, but the ranging performance with respect to the light point (for example, a tail lamp or a brake lamp of a preceding vehicle) at night is poor due to the influence of the individual difference of the optical system/imaging system. It is an object of the ranging arbitration of the present invention to perform ranging correction only in a case where the ranging is performed based on the light point captured at night for such individuals.

The ranging error of the stereo image is comprehensively affected by a lens structure (first processing process), the image processing (second processing process), and the like of the in-vehicle stereo camera device 10. Thus, it is essential to cope with the night ranging error problem by embedding lens related information in the manufacturing process of the in-vehicle stereo camera device 10 and by a ranging correction system using the information.

Thus, in the present embodiment, first, at the time of manufacturing the in-vehicle stereo camera device 10, optical characteristic data such as response characteristics and temperature characteristics of the left and right lenses and a luminance conversion curve (luminance conversion table) of an image are measured and stored in the storage unit 16. Further, at the time of actual traveling of the vehicle equipped with the in-vehicle stereo camera device 10, the necessity of the ranging correction is determined according to the optical characteristic data stored at the time of manufacturing and the environment (exposure condition, temperature, and luminance of the object) at the time of traveling, and correction is performed by luminance conversion.

<<Processing at Time of Manufacturing In-Vehicle Stereo Camera Device 10>>

Figure 6:
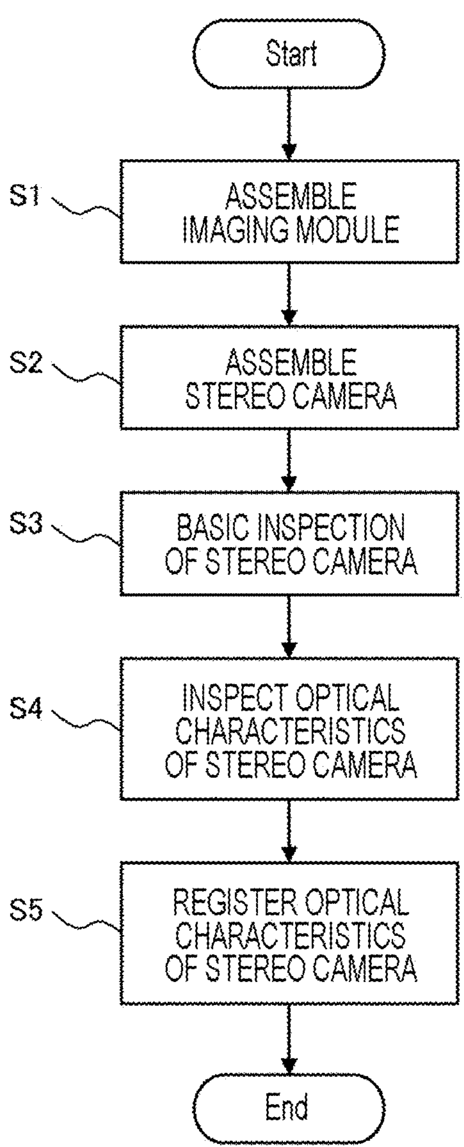
FIG. 6 is a processing flowchart at a time of manufacturing an in-vehicle stereo camera.

Here, details of processing at the time of manufacturing the in-vehicle stereo camera device 10 will be described with reference to the flowchart in FIG. 6.

First, in step S1, a pair of imaging modules is assembled in which an imaging element, a lens, and the like are combined.

Next, in step S2, a stereo camera is assembled using the pair of imaging modules assembled in step S1.

In step S3, basic matters such as whether the stereo camera is correctly assembled and whether the imaging element functions normally are inspected.

In step S4, the optical characteristics of the stereo camera are inspected. Specifically, the lens characteristics such as the light point spread function PSF are evaluated for each lens of the left camera 11 and the right camera 12 (see FIG. 4). In addition, luminance characteristics indicating how luminance conversion after capturing is performed is evaluated for each of the imaging elements of the left camera 11 and the right camera 12 (see FIG. 5). Furthermore, temperature dependence indicating how the lens characteristics and the luminance characteristics are affected by the temperature change is evaluated.

In step S5, the information obtained in step S4 is registered in the storage unit 16 as the optical characteristics database 7 for the individual stereo camera. Note that as illustrated in FIG. 3, the optical characteristics database 7 of the present embodiment is a database including lens characteristics 7*a* (see FIG. 4), temperature characteristic 7*b* related to temperature dependence of the lens characteristics 7*a*, luminance characteristics 7*c* (see FIG. 5), and temperature characteristics 7*d* related to temperature dependence of the luminance characteristics 7*c*.

<<Processing at Time of Manufacturing In-Vehicle Stereo Camera Device 10>>

Next, details of processing performed in the in-vehicle stereo camera device 10 when the vehicle equipped with the in-vehicle stereo camera device 10 travels on an actual road will be described based on the flowcharts in FIGS. 7 and 8.

Figure 7:
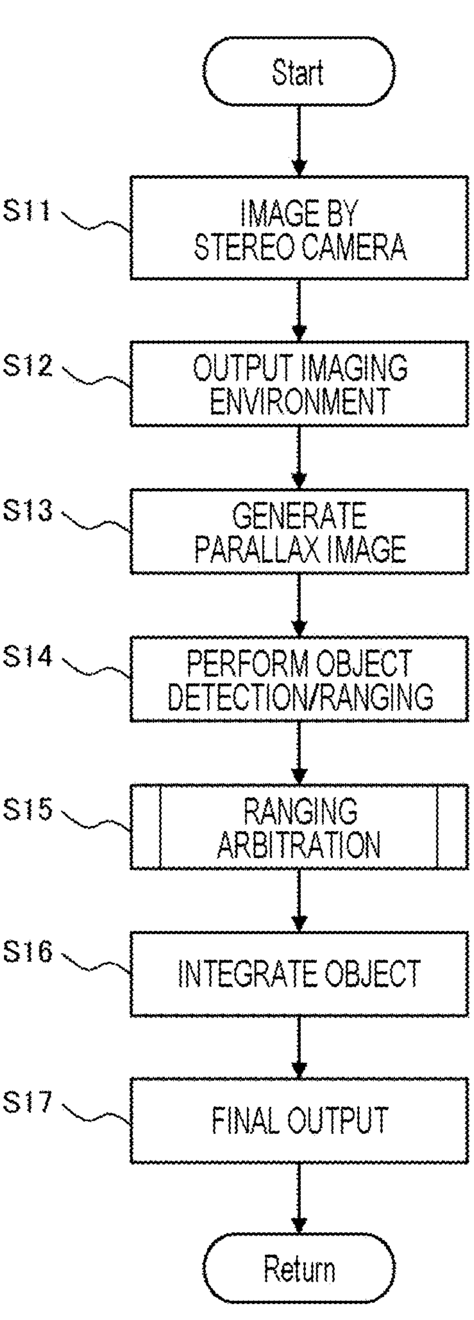
FIG. 7 is a processing flowchart at a time of traveling.

First, in step S11 in FIG. 7, the image input interface 13 causes the left camera 11 and the right camera 12 to synchronously capture the pair of images P (left image $P_L$ and right image $P_R$), and outputs the captured pair of images P to the image processor 14.

Next, in step S12, the image input interface 13 outputs the imaging environment (an exposure time, an environmental temperature, and the like) at the time of imaging in step S11 to the calculation processor 15 (ranging arbitration unit 6).

In step S13, the image processor 14 (Image correction unit 1 and parallax calculation unit 2) performs desired image correction on the left image $P_L$ and the right image $P_R$, and then performs the parallax calculation based on the corrected left image $P_L$ and right image $P_R$ to generate a parallax image.

In step S14, the image processor 14 (object detection/ranging unit 3) performs object detection and ranging on the object based on the corrected left image $P_L$ and right image $P_R$.

In step S15, the calculation processor 15 (object recognition unit 4 and ranging arbitration unit 6) performs the ranging arbitration according to the optical characteristics database 7 prepared in advance at the time of manufacturing and the imaging environment obtained in step S12. Note that details of this step will be described later.

In step S16, the calculation processor 15 (object recognition unit 4 and ranging arbitration unit 6) integrates type information of the object recognized in step S15 and distance information to the object.

In step S17, the calculation processor 15 (object recognition unit 4 and ranging arbitration unit 6) outputs the information integrated in step S16 to the control processor 17 (vehicle controller 8). As a result, the control processor 17 (vehicle controller 8) can transmit appropriate information according to a surrounding environment of the own vehicle to a vehicle system regardless of the individual difference of the stereo camera or the imaging environment.

Figure 8:
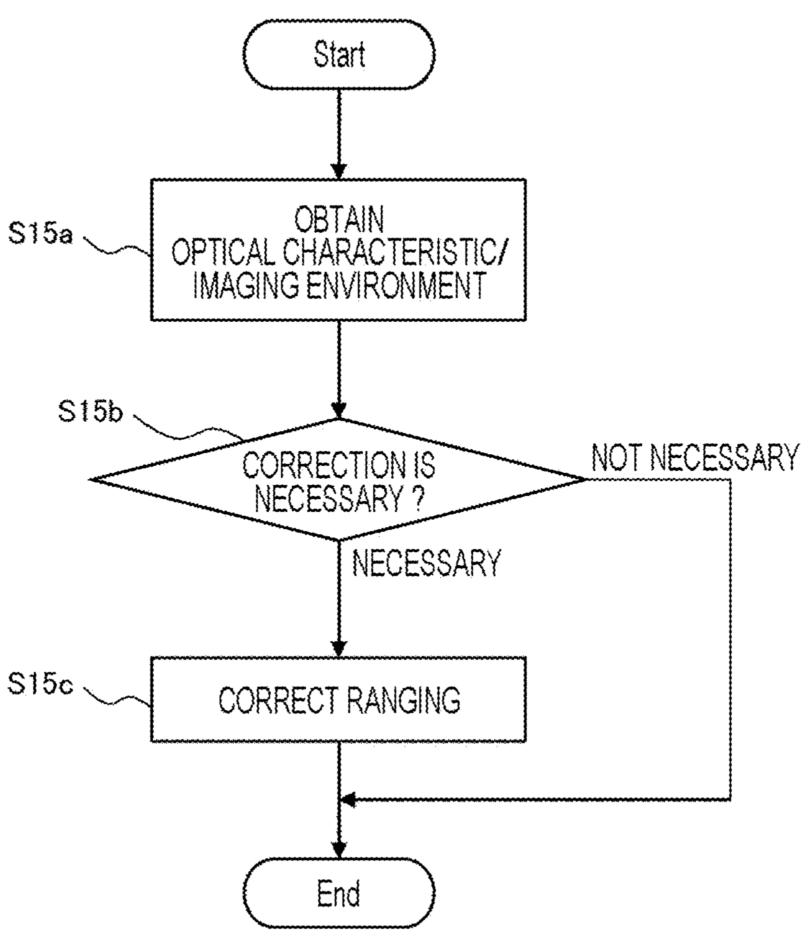
FIG. 8 is a flowchart of ranging arbitration.

FIG. 8 is a detailed processing flowchart of step S15 (ranging arbitration processing) in FIG. 7.

In step 15*a*, the calculation processor 15 obtains the lens characteristics 7*a* (see FIG. 4), the temperature characteristics 7*b* related to the lens characteristics 7*a*, the luminance characteristics 7*c* (see FIG. 5), and the temperature characteristic 7*d* related to the luminance characteristics 7*c* from the optical characteristics database 7 prepared in advance at the time of manufacturing. Furthermore, the calculation processor 15 obtains the exposure time and the environmental temperature from the imaging environment obtained in step S12. Note that there is a relationship that the exposure time becomes shorter as the imaging object is brighter, and thus brightness of the imaging object can be estimated from the exposure time.

In step S15*b*, the calculation processor 15 determines whether correction of the ranging result is necessary in step S14 based on the various types of information obtained in step S15*a*. Then, if the correction is necessary, the process proceeds to step S15*c*, and if the correction is unnecessary, the processing of step S15 is hunted.

Note that the situation in which it is determined that the correction of the ranging result is necessary is, for example, as follows.

(1) A case where the brightness of the imaging object is a predetermined value or more (a case where the exposure time at the time of imaging is less than a predetermined value).

(2) A case where the environmental temperature at the time of imaging is a predetermined value or more.

In step S15*c*, the calculation processor 15 corrects the ranging result in step S14 in consideration of the individual difference of the stereo camera. This correction processing includes processing of estimating a ranging error that may occur by collation with the characteristic (of the individual stereo camera)—the environment (at the time of traveling), thereby determining the ranging correction, and performing the ranging correction on the object.

Various processing can be considered for the ranging correction processing. For example, in a case falling under the above (1), the ranging result in step S14 is corrected in consideration of the lens characteristics 7*a* and the luminance characteristics 7*c* of the individual stereo camera. In addition, in a case falling under the above (2), the ranging result in step S14 is corrected in consideration of the temperature characteristics 7*b* and 7*d*. Specifically, processing of performing image filter calculation so as to equalize the light point spread function PSF of the left and right lenses may have a low contribution in improving the accuracy of subpixel calculation, and thus it is effective to perform the parallax calculation after performing a narrowing calculation (narrowing of exposure described in a general camera) of luminance on the image, to apply a ranging correction table according to the luminance of the object and the temperature characteristics at the time of imaging, and the like.

As described above, in order to reduce the influence of the ranging error caused by the optical system/imaging system, the present invention records the information related to the characteristics of the optical system/imaging system at the time of manufacturing the stereo camera, and in a case where the external recognition is performed by the stereo camera attached to the vehicle, the ranging performance is improved by comparing the imaging environment such as the exposure and the temperature at the time of imaging by the left and right cameras for the stereo vision and the characteristic information recorded at the time of manufacturing the stereo camera to perform the arbitration processing of the ranging result.

Furthermore, the present invention is an in-vehicle stereo camera device that performs image processing on the image captured by a pair of imaging units. The in-vehicle stereo camera device determines whether a temporal change (change in imaging characteristics due to a temperature or imaging conditions) of the optical system/imaging system is a condition that satisfies the parallax calculation in a case where an imaging unit of the optical system/imaging system performs the parallax calculation from the images captured by the two left and right cameras, or in a case where the condition is not satisfied, the in-vehicle stereo camera device includes a means for designing a coefficient for correcting a ranging result after the parallax calculation according to an environmental factor (brightness of the object, an exposure time, an environmental temperature, and the like) at the time of imaging and correcting a result of object ranging using the coefficient, and then outputting a result in the stereo vision.

As described above, according to the present invention, the influence on the ranging error caused by the temporal change of the optical system/imaging system can be reduced by focusing on characteristics (individual difference) of the optical system/imaging system of the in-vehicle stereo camera device.

REFERENCE SIGNS LIST

10 in-vehicle stereo camera device
1 image correction unit
2 parallax calculation unit
3 object detection/ranging unit
4 object recognition unit
5 recognition dictionary
6 ranging arbitration unit
7 optical characteristics database
7*a* lens characteristics
7*c* luminance characteristics
7*b*, 7*d* temperature characteristics
8 vehicle controller
11 left camera
12 right camera
13 image input interface
14 image processor
15 calculation processor
16 storage unit
17 control processor
18 CAN interface
19 internal bus

The invention claimed is:

1. An external environment recognition device comprising:
- a computer processing unit (CPU) configured to:
  - calculate parallax from images captured by an in-vehicle camera device including a plurality of cameras;
  - obtain from the parallax a distance to an object outside a vehicle;
  - record response characteristics and luminance characteristics of each lens of the plurality of cameras, wherein the response characteristics of the lens further includes data depending on a temperature;
  - determine whether the distance to the object is necessary to be corrected using the temperature dependence in addition to the response characteristics of the lens, and the luminance characteristics of the lens; and
  - correct the distance to the object based on the temperature dependence in addition to the response characteristics of the lens, and the luminance characteristics of the lens when it is determined that the correction is necessary,
- wherein the CPU is further configured to:
  - inspect the response characteristics and the luminance characteristics of the lens at the time of manufacturing the in-vehicle camera device, and
  - record the response characteristics and the luminance characteristics of the lens.

2. An external environment recognition device comprising
- a computer processing unit (CPU) configured to:
  - calculate parallax from images captured by an in-vehicle camera device including a plurality of cameras;
  - obtain from the parallax a distance to an object outside a vehicle;
  - record response characteristics and luminance characteristics of each lens of the plurality of cameras, wherein the response characteristics of the lens further includes data depending on a temperature;

determine whether the distance to the object is necessary to be corrected using the temperature dependence in addition to the response characteristics of the lens, and the luminance characteristics of the lens; and correct the distance to the object based on the temperature dependence in addition to the response characteristics of the lens, and the luminance characteristics of the lens when it is determined that the correction is necessary, wherein the CPU is further configured to determine that the distance to the object is necessary to be corrected when brightness of the object is a predetermined value or more.

3. The external environment recognition device according to claim 1, wherein the CPU is further configured to determine that the distance to the object is necessary to be corrected when an exposure time is less than a predetermined value.

4. The external environment recognition device according to claim 1, wherein the CPU is further configured to determine that the distance to the object is necessary to be corrected when the temperature of the imaging environment is a predetermined value or more.

5. A method for monitoring an external environment comprising:

performing parallax calculation of calculating parallax from an image captured by an in-vehicle camera device including a plurality of cameras;

performing ranging of obtaining from the parallax a distance to an object outside a vehicle;

recording response characteristics and luminance characteristics of each lens of the plurality of cameras, wherein the response characteristics of the lens further include data depending on a temperature;

performing ranging correction necessity determination of determining whether the distance to the object is necessary to be corrected based on the temperature dependence in addition to the response characteristics of the lens, and luminance characteristics of each lens of the plurality of cameras; and performing ranging correction of correcting the distance to the object based on the temperature dependence in addition to the response characteristics of the lens, and the luminance characteristics of the lens when it is determined that the correction is necessary, wherein the method further comprises:

inspecting the response characteristics and the luminance characteristics of the lens at the time of manufacturing the in-vehicle camera device, and recording the response characteristics and the luminance characteristics of the lens.

* * * * *